United States Patent [19]

Kruger et al.

[11] Patent Number: 5,578,378
[45] Date of Patent: Nov. 26, 1996

[54] ANTI-FOGGING COATING COMPOSITION, PRODUCT COATED WITH SAID COMPOSITION AND METHOD FOR PREPARATION OF SAID PRODUCT

[75] Inventors: Albert A. Kruger, Richland, Wash.; Pascal Chartier, Paris, France

[73] Assignee: Saint-Gobain Vitrage, Courbevoie, France

[21] Appl. No.: 504,838

[22] Filed: Jul. 20, 1995

Related U.S. Application Data

[62] Division of Ser. No. 366,016, Dec. 29, 1994, Pat. No. 5,480,917, which is a continuation of Ser. No. 964,559, Oct. 21, 1992, abandoned, which is a continuation of Ser. No. 272,462, Nov. 17, 1988, abandoned.

[30] Foreign Application Priority Data

Nov. 19, 1987 [FR] France .................................. 87 15986

[51] Int. Cl.⁶ ................. B32B 17/10; C08J 7/18
[52] U.S. Cl. ............... 428/441; 428/422; 428/522; 522/33; 427/508; 427/517
[58] Field of Search ............................. 428/422, 441, 428/522; 427/508, 517; 522/33

[56] References Cited

U.S. PATENT DOCUMENTS

| 3,865,619 | 2/1975 | Pennwiss et al. ..................... 117/138.8 |
| 3,968,306 | 7/1976 | Yoshihara et al. ....................... 428/336 |
| 4,062,817 | 12/1977 | Westerman ................................ 526/15 |
| 4,512,340 | 4/1985 | Buck ......................................... 522/14 |
| 4,582,862 | 4/1986 | Berner et al. ............................ 522/14 |

*Primary Examiner*—Mark Chapman
*Attorney, Agent, or Firm*—Oblon, Spivak, McClelland, Maier & Neustadt, P.C.

[57] ABSTRACT

An anti-fogging coating comprises from 40 to 80% by weight of at least one acrylic or methacrylic acid monomer, from 20 to 60% by weight of at least one short chain acrylic or methacrylic acid ester monomer and, in relation to the total weight of the preceding monomers, from 1 to 15% of a crosslinking agent and from 0.1 to 5% of a polymerization initiator compound using the action of ultraviolet radiation. Transparent products formed from a glass or poly(methyl methacrylate) support and a layer of the preceding composition, polymerized and crosslinked by the action of ultraviolet radiation, exhibit good anti-fogging and mechanical resistance properties.

10 Claims, No Drawings

ANTI-FOGGING COATING COMPOSITION, PRODUCT COATED WITH SAID COMPOSITION AND METHOD FOR PREPARATION OF SAID PRODUCT

This is a division of application Ser. No. 08/366,016 filed on Dec. 29, 1994, U.S. Pat. No. 5,480,917 which is a file wrapper continuation of 07/964,559, filed on Oct. 21, 1992, now abandoned (Dec. 29, 1994), which is a file wrapper continuation application Ser. No. 97/272,462, filed on Nov. 17, 1988, now abandoned (Oct. 21, 1992)

BACKGROUND OF THE INVENTION

1. Field of the Invention

The present invention relates to an anti-fogging coating composition used on a support for forming an anti-fogging, mechanically resistant film, a product bearing said film, whose surface has an anti-fogging character,-and a method for preparing said product.

2. Background of the Art

Numerous supports, such as plastics and glass, have the disadvantage of becoming fogged when their surface temperature falls beneath the dewpoint of the surrounding air. This is particularly true of the glass which is used to form glazings for transportation vehicles or buildings, optical glasses, lenses, mirrors, etc. The formation of fog on these surfaces causes a decrease in transparency due to diffusion of light by drops of water, which can be highly bothersome.

In order to prevent the formation of fog, that is the condensation of fine droplets of water on a support, the deposit of hydrophilic layers has been proposed. Thus, German Patent DE 1 928 409 describes an anti-fogging coating formed of hydroxyalkyl acrylate or methacrylate polymers. These very hydrophilic layers absorb water and provide the formation, in the presence of excess water, of a film of water on the surface which does not impede transparency. However, these layers, through the absorption of water, swell, soften and becomes less mechanically resistant.

Crosslinking these layers improves their mechanical resistance, but their anti-fogging property, that is the ability to absorb the water over the entire surface of the support, decreases.

To compensate for the harmful effect of the crosslinking on the anti-fogging character, it has been proposed, as described in French Patent 2 253 075 for example, to add tensio-active agents.

However, research has continued to find compositions for anti-fogging coating from which, using processes which are easily carried out, layers can be formed whose anti-fogging and mechanical resistance properties are lasting.

SUMMARY OF THE INVENTION

The object of the present invention, therefore, is to provide a composition for ansi-fogging coating which is used to form on a support a film having characteristics of anti-fogging and mechanical resistance, particularly scratch-resistance, while retaining the optical qualities of the support, a product formed by a glass or plastic support coated with said anti-fogging composition, and a method for preparing said product.

The anti-fogging, scratch-resistant coating composition in accordance with the invention comprises: A) from 40 to 80% by weight of at least one acrylic or methacrylic acid monomer, B) from 20 to 60% by weight of at least one short chain acrylic or methacrylic acid ester monomer, C) from 1 to 15% by weight, based on the total weight of monomers (A) and (B), of a crosslinking agent, and D) from 0.1 to 5% by weight, based on the total weight of monomers (A) and (B), of a polymerization initiator using the action of ultraviolet radiation.

DETAILED DESCRIPTION OF THE INVENTION

As indicated, the preparation of compositions used for forming on a support a layer with anti-fogging and scratch-resistant characteristics encounters contradictory requirements: the layers with the best ansi-fogging action have lower scratch resistance and when the scratch-resistance of the layers is improved, a decrease in the anti-fogging effect is observed.

Therefore, the selection and the quantity of the various components of the composition in accordance with the invention are determining factors for obtaining a layer having the desired properties.

Component (A), the acrylic or methacrylic acid monomer, provides the hydrophilic characteristics and is used in an amount of 40 to 80% by weight, preferably in an amount of 50 to 60%. Amounts of less than 40% lead to the formation of a less hydrophilic layer with insufficient anti-fogging properties.

Component (B) is an ester of the acrylic or methacrylic acid which provides the layer obtained with better mechanicals resistance. This ester preferably has a short chain to further provide a hydrophilic character.

Component (B) corresponds to the formula

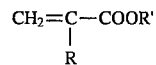

where R is a hydrogen atom or a methyl group and R' is a lower alkyl group or a lower hydroxyalkyl group. The alkyl groups preferably contain from 1 to 4 carbon atoms. When the alkyl group contains more than 4 carbon atoms, the monomer has a hydrophobic effect: it is then necessary to use it in a lesser amount to the advantage of monomer A, the acrylic or methacrylic acid, and the mechanical resistance of the polymer decreases.

The esters which can be particularly used in the invention are methyl acrylate, methyl methacrylate, hydroxyethyl methacrylate and hydroxypropyl methacrylate. It is preferred to use methyl methacrylate which, in addition to scratch-resistant characteristics, provides properties of transparency and adhesion, particularly to glass.

Component (B) is used in an amount of 20% to 60% by weight and preferably 40 to 50% by weight.

Any suitable polyfunctional compound can be used as the crosslinking agent. Particularly useful crosslinking agents are polyfunctional acrylic monomers or oligomers, such as 1,4-butanediol diacrylate, trimethylol propane triacrylate, dipentaerythritol pentaacrylate, tripropyleneglycol diacrylate and diethyleneglycol diacrylate. The crosslinking agent represents from 1 to 15% of the total weight of monomers (A) and (B), and preferably from 5 to 10%.

The mechanical resistance of the layer obtained from the composition in accordance with the invention depends on the presence of the acrylate or methacrylate monomer, mentioned above, and also on the crosslinking agent used. Thus, with a polyfunctional acrylic crosslinking agent, such as dioentaerythritol pentaacrylate, greater crosslinking of the polymer can be obtained, which improves the mechanical resistance. The acrylic or methacrylic ester (component B) can then be used in a lesser quantity and the quantity of component (A), the acrylic or methacrylic acid can be increased, which principally provides the hydrophilic properties and, consequently, the desired anti-fogging characteristic.

The compound for initiating polymerization using ultraviolet radiation generally represents from 0.1 to 5% of the total weight of monomers (A) and (B) and preferably from 0.1 to 0.5%. Highly active compounds for the polymerization of unsaturated monomers, such as benzophenone, benzil, thioxanthones and their derivatives, are used as the polymerization initiator. Polymerization initiators which are useful for the invention are, for example, the "Irgacure" products sold by Ciba-Geigy, such as "Irgacure 651" (benzildimethylketal), "Irgacure 184" (hydroxy-1-cyclohexyl)-phenylketone, "Irgacure 500" which is a mixture of benzophenone and (hydroxy-1-cyclohexyl)phenylketone or 2-dimethyl-1-[4-methylthiophenyl]-2-morpholinopropanone-1.

It should be noted that the combination of the above-cited compounds, that is (A) acrylic or methacrylic acid, (B) short chain acrylate or methacrylate, (C) crosslinking agent and (D) polymerization initiator, constitutes the essential basis of the composition in accordance with the invention which, depending on the components themselves and the quantities used thereof, confers the desired anti-fogging and mechanical resistance properties to the subsequently formed layer.

The invention also relates to a product with the characteristics of anti-fogging and mechanical resistance, particularly scratch-resistance, which comprises a support and a layer of the above-described composition, which is polymerized by the action of ultraviolet radiation.

The support can be comprised of any substance which has the disadvantage of becoming covered with fog when it is in conditions of temperature and humidity causing the condensation of water droplets. In particular, these supports are generally of glass and plastics, such as poly(methyl methacrylate), which are particularly used in transportation vehicles and buildings due to their transparency. The composition in accordance with the invention is particularly appropriate for the formation of a layer on said supports since it maintains their optical qualities.

Prior to the application of the composition in accordance with the invention, these supports must be very clean in order so be perfectly wettable and enable good spreading, even spontaneous spreading, of the composition. These supports can possibly have an intermediate layer or be treated by any suitable method to improve the adhesion of the layer.

A composition in accordance with the invention, preferably used to form the anti-fogging layer on these supports, contains acrylic acid and methyl methacrylate as monomers (A) and (B).

These monomers can be combined with an acrylic crosslinking agent, such as 1,4-butanediol diacrylate, and a polymerization initiator using ultraviolet, such as benzildimethylketal. In this case, good results are obtained when the acrylic acid and methyl methacrylate monomers are used in equal amounts.

These monomers can also be combined, in order to form a composition in accordance with the invention which is useful for obtaining the desired results, with a crosslinking agent containing two functional groups, such as dipentaerythritol pentaacrylate. In this case, as has been indicated, there is more crosslinking of the composition and a layer having improved mechanical resistance is formed. A composition providing satisfactory results as to the anti-fogging and mechanical resistance characteristics, can contain 60% by weight acrylic acid and 40% by weight methyl methacrylate.

The amount of crosslinking agent in such a composition depends on the crosslinking desired. 10% by weight, in relation to the total weight of acrylic acid and methyl methacrylate monomers, of said crosslinking agent gives good results.

The above-described compositions are particularly well suited for supports such as glass. It is, of course, possible to vary the quantities of the various components of the composition within the previously-indicated ranges, in order to obtain a particular result which may depend on the support used and the magnitude of the anti-fogging characteristic desired.

The layer, applied using the composition in accordance with the invention onto a support such as glass or poly(methyl methacrylate), is not soluble either in water or in conventional organic solvents, such as acetone, chloroform or propylene carbonate. It is more scratch-resistant than, for example, the acrylic acid or methyl methacrylate based polymers proposed in the prior art as anti-fogging layers. It has an anti-fogging character which is practically permanent: in particular, it does not become covered with fog, even in highly humid atmospheres and at temperatures below the dewpoint, as can be the case in a bathroom or inside an automobile. The layer even retains a dry feel, which would lead one to believe that it is highly water-absorbent.

The layers obtained in accordance with the invention are of particular interest for poly(methyl methacrylate) supports.

In effect, these are known to have weak scratch-resistance and the presence of the layers in accordance with the invention not only provides them with an anti-fogging character, but significantly increases their scratch-resistance.

The thickness of the anti-fogging layer depends on the use planned for the product. It is thought that the water absorption of the layer, which prevents the formation of fog on the support, increases with the thickness of the layer. If a product is sought with high anti-fogging characteristics, the layer is preferably thick. However, a thick layer necessitates greater crosslinking in order to provide it with sufficient mechanical resistance, which can be harmful to the hydrophilic, and therefore anti-fogging, character of the layer, as has been mentioned above. Layers of 20 to 100 μm can be used in a satisfactory manner.

The method in accordance with the invention to manufacture a product having anti-fogging and mechanical resistant characteristics consists: of cleaning the surface or surfaces to be coated in order to render them perfectly wettable; of applying on said surfaces a layer of a composition in accordance with the invention, of exposing said coated surfaces to ultraviolet radiation in order to polymerize and crosslink the composition.

It is important that the surface to be coated with the composition in accordance with the invention be perfectly clean so that the composition can be spread easily, or even spontaneously, in order to form a homogeneous layer over the entire surface.

To obtain such a surface, any method of treatment which is appropriate to each surface can be used. Thus, when the surface is glass, it can, for example, be washed with water and soap, in particular with an aqueous solution of "Deconex 12" (which is a phosphate combined with a tensio-active agent, made by Societe Borer Chemie). It is then rinsed with distilled water and then with alcohol. It is possibly dried in a kiln or oven.

With a plastic support, such as poly(methyl methacrylate), for the washing, an aqueous solution with 10% "Teepol" can be used, it is rinsed with distilled water and then dried in a kiln at approximately 50° C.

The treatment described above is not necessary if the support is perfectly clean; this is particularly the case with the surface of glass when the glazing exits the production furnace. The anti-fogging treatment in accordance with the invention applied to a glazing can take place on the production line without using the first step of the previously described method.

The layer of anti-fogging composition applied on the clear surface of the support must be homogeneous. Any suitable layering method can be used to obtain such a layer, for example a layering method using pouring, a drawing film if the composition has an adequate viscosity, or a reel, etc. Layering using pouring is particularly suitable when the composition is very fluid: spontaneous spreading of the composition can then be obtained without using external action which could lead to a discontinuity in the layer.

The support coated with the layer of composition is exposed to ultraviolet radiation to initiate the polymerization and crosslink the polymer. For this exposure, a mercury vapor lamp is used for example, the power of which can vary from several tens of watts to several thousands of watts per square meter of surface to be treated. The exposure time and the power of the lamp used depend on the composition, the thickness of the layer and the degree of crosslinking desired. In particular, since the monomers, such as acrylic acid and methyl methacrylate are very volatile, a lamp whose power is not too high must be used to prevent the evaporation of the monomers. The exposure to ultraviolet light preferably takes place in an atmosphere lacking in oxygen and water vapor, which inhibit polymerization, particularly when the quantity of the polymerization initiator compound is small. The crosslinking must be sufficient for the polymer to be insoluble in water and conventional organic solvents and sufficient to impart mechanical resistance which is suitable for the subsequently planned use; however, it must be such that the polymer retains its hydrophilic character which makes the layer anti-fogging.

In order to improve the anti-fogging character of the layer obtained, it can possibly be treated, after crosslinking, with a basic compound, such as an aqueous solution of sodium (preferably 0.2 M) for a few seconds, from 5 to 20 seconds approximately, or with ammonia for a few minutes, from 3 to 5 minutes approximately. This treatment, which promotes surface ion exchange, can be particularly useful when the amount of acrylic acid is less than 60% of the total weight of monomers (A) and (B).

To determine the scratch resistance of the layer, the Taber (Teledyne Taber Abrasets) method is used, in accordance with which the coated support is submitted to the abrasive action of a cylindrical abrasive plate (CS 10 F Resilient Calibrase Wheel) under a charge of 250 g for 30 cycles. The increase (in %) in turbidity of the product treated is then measured by comparison with the initial turbidity of the product. The turbidity of the product can be compared to that of a poly(methyl methacrylate) film, which is known to be very sensitive to scratching, which has undergone the same abrasion test.

For the evaluation of the anti-fogging effect, various methods can be used For example, the coated product to be tested can be placed on a container containing water maintained at a temperature 10° C. higher than the ambient temperature. As a measurement of the behavior of the support water condensation, the time taken for the beginning of condensation to be perceptible to the naked eye (time for the fog to appear) can be noted. With uncoated supports, the beginning of condensation is noticeable almost immediately. Blowing on the product can also provide a first idea for evaluating the anti-fogging effect, especially as it corresponds to fog formation conditions which are particularly severe for a support.

The following non-limiting examples illustrate the invention.

EXAMPLE 1

A sheet of silica-soda lime glass obtained using the float glass manufacturing technique was used as the support.

The surface to be treated was cleaned by soaking it in an aqueous solution with 3% "Deconex 12" (Borer Chemie) for one hour. It was rinsed with distilled water and alcohol. It was dried in a kiln at 120° C. for approximately one hour. In this manner a very wettable surface was obtained with the angle of contact of a drop of water on said surface being less than 5°.

A mixture was prepared comprising 50% by weight of acrylic acid (component A) and 50% by weight of methyl methacrylate (component B), with both components having been purified in advance if necessary. A crosslinking agent, 1,4-butanediol diacrylate (SR 213 from Sartomeer), was added to this mixture, as was a polymerization initiator, benzildimethylketal (Irgacure 651 from Ciba-Geigy). These products were added in amounts, calculated in relation to the total volume of monomers A and B, of 5% and 0.1% respectively by weight.

The sheet of glass to be treated was placed on a very stable support to prevent subjecting it to any vibration which would prevent the formation of a homogeneous layer.

The previously prepared composition was applied to the sheet of glass by pouring. The very liquid composition fell drop by drop onto the center of the sheet and spread spontaneously over the support to form a homogeneous layer of a thickness of approximately 50 μm.

The coated sheet of glass was then exposed, at room temperature and under a nitrogen atmosphere, to ultraviolet radiation using a mercury vapor lamp UVP model B 100 A, with a power of 100 W, situated at 25 cm from the sheet. The exposure time was 20 minutes.

The polymer layer was then subjected to ammonia vapor for 5 minutes. An optically satisfactory layer was obtained.

The anti-fogging character of the treated sheet of glass was evaluated by submitting it for one day to the above-described test. No water condensation was noted. An uncoated sheet of glass, acting as a reference, was immediately covered with fog.

The scratch-resistance test indicated 10% increase in turbidity, while the same test on a poly(methyl methacrylate) film indicated a 25% increase in turbidity.

EXAMPLE 2

The method of Example 1 was repeated, but a composition was used containing 60% by weight of acrylic acid and 40% by weight of methyl methacrylate and, in relation to the total volume of said monomers, 10% dipentaerythritol pentaacrylate (SR 399 from Sartomeer) as the cross-linking agent and 0.2% of a polymerization initiator "Irgacure 651".

This composition was applied to a sheet of glass cleaned as indicated in Example 1, by using a drawing film providing a layer of approximately 20 μm.

The layer was exposed as in the preceding example. The anti-fogging character of the layer was evaluated as in Example 1. At the end of one day, no water condensation was noted. The scratch-resistance test indicated a turbidity of 1.2%.

The layer obtained was optically satisfactory.

EXAMPLE 3

The method of Example 2 was repeated, except that the composition contained 10% by weight of trimethylolpropane triacrylate (SR 351 from Sartomer) as the crosslinking agent and 0.1% by weight of "Irgacure 651" as the polymerization initiator.

The composition was applied to a sheet of clean glass as indicated in Example 2, and was exposed as in the preceding examples.

The layer obtained was optically satisfactory. The anti-fogging character was evaluated as in Example 1. The layer had no water condensation. The scratch resistance test indicated turbidity of 8%.

Obviously, numerous modifications and variations of the present invention are possible in light of the above teachings. It is therefore to be understood that within the scope of the appended claims, the invention may be practiced otherwise than as specifically described herein.

We claim:

1. A product having anti-fogging and scratch-resistance characteristics, comprising a support and at least one anti-fogging layer, wherein the layer is formed from a composition consisting essentially of components (A), (B), (C) and (D), on the basis of components (A) and (B) totaling 100%, by weight:

(A) from 40 to 60by weight of at least one acrylic or methacrylic acid monomer, (B) from 60 to 40% by weight of at least one acrylic or methacrylic acid ester monomer of the formula

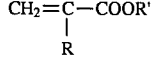

wherein R is H or $CH_3$ and R' is a $C_{1-4}$ alkyl, (C) from 1 to 15% by weight, based on the total weight of monomers (A) and (B), of a crosslinking agent, and (D) from 0.1 to 5% by weight, based on the total weight of monomers (A) and (B), of a polymerization initiator using the action of ultraviolet radiation, said layer being crosslinked by exposure to ultraviolet radiation.

2. The product in accordance with claim 1, wherein the support is comprised of glass or poly(methyl methacrylate).

3. The product in accordance with claim 1, wherein the thickness of the layer is 20–100 μm.

4. The product of claim 1, wherein the crosslinking agent is a polyfunctional acrylic monomer or oligomer.

5. The product of claim 4, wherein the cross-linking agent is selected from the group consisting of 1,4-butanediol diacrylate, trimethylol propane triacrylate, dipentaerythritol pentaacrylate, tripropyleneglycol diacrylate, diethyleneglycol diacrylate and mixtures thereof.

6. The product of claim 1, wherein the polymerization initiator is selected from the group consisting of benzildimethylketal, (hydroxy-1-cyclohexyl)-phenylketone, benzophenone and 2-dimethyl-1-[4-(methylthio) phenyl]-2-morpholinopropanone 1.

7. The product of claim 1, comprising from 50 to 60% by weight of monomers (A), from 40 to 50% by weight of monomers (B), and, based on the total weight of monomers (A) and (B), from 5 to 10% by weight of crosslinking agent (C) and 0.1 to 0.5% of polymerization initiator (D).

8. A method for manufacturing a product having anti-fogging and good mechanical resistance properties comprising:

1) cleaning a surface or surfaces, of a support to be coated, in order to render them wettable, 2) applying on said cleaned surfaces of the support a composition consisting essentially of components (A), (B), (C) and (D), on the basis of components (A) and (B) totaling 100%, by weight:

(A) from 40 to 60% by weight of at least one acrylic or methacrylic acid monomer, (B) from 60 to 40% by weight of at least one acrylic or methacrylic acid ester monomer of the formula

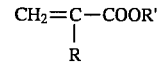

wherein R is H or $CH_3$ and R' is a $C_{1-4}$ alkyl, (C) from 1 to 15% by weight, based on the total weight of monomers (A) and (B), of a crosslinking agent, and (D) from 0.1 to 5% by weight, based on the total weight of monomers (A) and (B), of a polymerization initiator using the action of ultraviolet radiation, thereby obtaining a homogeneous layer, 3) exposing said coated surfaces to ultraviolet radiation in order to polymerize and crosslink the homogeneous layer.

9. The method in accordance with claim 8, wherein, after exposure to the ultraviolet radiation, the coated surfaces are treated with a base in order to obtain a surface ion exchange.

10. The method in accordance with claim 9, wherein the surfaces which are coated and exposed to ultraviolet radiation are treated with ammonia or an aqueous solution of soda.

* * * * *